US006899924B1

(12) United States Patent
Carson et al.

(10) Patent No.: US 6,899,924 B1
(45) Date of Patent: May 31, 2005

(54) COATING COMPOSITIONS AND PROCESSES

(75) Inventors: Peter Carson, Shildon (GB); Rodney Ralph Brooks, Wokingham (GB); Michael Fowler, Nuneaton (GB)

(73) Assignee: PRC-DeSoto International, Inc., Glendale, CA (US)

( * ) Notice: Subject to any disclaimer, the term of this patent is extended or adjusted under 35 U.S.C. 154(b) by 0 days.

(21) Appl. No.: 09/646,505

(22) PCT Filed: Mar. 16, 1999

(86) PCT No.: PCT/GB99/00777

§ 371 (c)(1),
(2), (4) Date: Jul. 30, 2001

(87) PCT Pub. No.: WO99/47613

PCT Pub. Date: Sep. 23, 1999

(30) Foreign Application Priority Data

Mar. 18, 1998 (GB) .............................. 9805836

(51) Int. Cl.[7] .................................. B05D 3/02
(52) U.S. Cl. .................... 427/384; 427/407.1; 427/333; 427/336; 427/142; 427/386; 524/291; 524/158; 523/455; 523/461; 428/414.1; 428/500; 428/413; 428/515
(58) Field of Search .............................. 427/384, 407.1, 427/333, 336, 142, 386, 410; 524/291, 158, 43, 45, 49, 56, 58; 523/455, 6, 400; 428/414.1, 500, 413, 515

(56) References Cited

U.S. PATENT DOCUMENTS 3,287,156 A * 11/1966 Griffith ..................... 220/62.11
4,525,511 A * 6/1985 Kirby et al. ................ 524/158
4,620,994 A * 11/1986 Suss et al. ............... 427/407.1
4,801,392 A * 1/1989 Adair et al. .............. 252/62.54
5,330,627 A * 7/1994 Grutter et al. ............... 204/489
5,470,899 A * 11/1995 Gulbins et al. ............. 524/158
6,214,418 B1 * 4/2001 Igarashi et al. .......... 427/407.1
6,271,377 B1 * 8/2001 Galbo et al. .................. 546/14

FOREIGN PATENT DOCUMENTS

| DE | 199346 | * 10/1986 |
| JP | 51122129 A | 10/1976 |
| JP | 59093758 | * 5/1984 |
| JP | 05045798 | * 2/1993 |
| JP | 08053632 | * 2/1996 |

OTHER PUBLICATIONS

Abstract, JP 59093758, Mistui Petrochemical Ind., May, 30, 1984.*
Abstract, JP 08053632, Tanabe et al., Feb. 27, 1996.*
Abstract, EP 199346, Lieberherr, Oct. 29, 1986.*
Abstract, JP 05045798, Noda et al., Feb. 26, 1993.*

* cited by examiner

*Primary Examiner*—David J. Buttner
*Assistant Examiner*—Christopher Keehan
(74) *Attorney, Agent, or Firm*—Finnegan, Henderson, Farabow, Garrett & Dunner, L.L.P.

(57) ABSTRACT

An undercoat composition comprises a film-forming synthetic resin and contains a non-volatile acidic aromatic polar organic compound in free acid or salt form, which compound facilitates the removal by a stripping composition of a top coat paint which is subsequently applied over the undercoat. A top coat composition for applying as the outer coating on a substrate comprises a film-forming synthetic resin having functional groups and a curing agent for crosslinking the synthetic resin and contains a non-volatile acidic aromatic polar organic compound in free acid or salt form, which compound facilitates the removal of the cured top coat by a stripping composition from a cured undercoat of similar composition which does not contain the said acidic aromatic polar organic compound.

88 Claims, No Drawings

_US 6,899,924 B1_

COATING COMPOSITIONS AND PROCESSES

FIELD OF THE INVENTION

This invention relates to the application to a substrate of a coating system in which a cured primer coating is ,overcoated with a top coat which is intended to be strippable, that is to say removable from the primed substrate by a paint stripping composition without removal of the primer from the substrate. Such coating systems are widely used on aircraft and may also be used on other substrates, for example commercial vehicles, cars, yachts or railway vehicles.

The cured primer and top coat must resist water and certain organic solvents such as aviation fuel and preferably also resist hydraulic fluids based on phosphate esters such as tricresyl phosphate or tri-n-butyl phosphate, e.g. that sold under the trade mark "Skydrol". Each coating is generally cured by the reaction of components which have been packaged separately and are mixed at or shortly before application. When an aircraft is to be repainted it is usual to remove at least the top coat using a paint stripper before repainting. The preferred stripping compositions used nowadays are based on aqueous benzyl alcohol with additives such as acidic (formic or oxalic acid) or alkaline (to pH 11 or 12) or neutral additives, although some halogenated solvents such as methylene chloride with phenol are still used. In general, the top coat adheres to the primer so strongly that the top coat cannot be stripped without removing or at least damaging the primer. Aircraft owners and operators would prefer a paint system in which the primer remained on the aircraft to prevent the stripping composition contacting any resins, sealants or adhesives used in the aircraft construction or the metallic substrate and to avoid repeating the pre-treatment and primer coating of the aircraft.

BACKGROUND ART

GB-A-1511935 describes a strippable coating system comprising a non-crosslinked polyamide intermediate coating between the primer and the top coat. This at least partially resists the solvent used to remove the top coat and can itself easily be removed by alcohol-based solvents to reveal the primer. DE-A-2528943 describes a linear non-crosslinked elastic polyurethane coating used between crosslinked polyurethane primer and top coat layers. EP-A-147984 describes a barrier intermediate coating comprising a film-forming addition polymer comprising units of a vinyl aromatic monomer and units of a monomer containing a hydroxy alkyl group in an amount to provide a hydroxyl content of the addition polymer in the range 0.5 to 5 per cent by weight reacted with a polyisocyanate containing at least 2 isocyanate groups per molecule.

WO-A-98/13148 describes a process for overcoating a substrate having a cured primer coating with a curable top coat which when cured is swellable by a stripping composition, in which process a non-volatile polar material having high affinity for the primer surface is applied to the primed substrate from an aqueous liquid vehicle before coating with the top coat, whereby the said polar material facilitates the removal of the top coat from the primer by the stripping composition.

EP-A-14597 describes a paint undercoat in which the film-forming resin has an acid value of from 10 to 45 mg KOH/g. Paint films including such an undercoat are stripped by means of a paint stripper having a pH of from 8 to 14 which attacks the undercoat paint film.

DISCLOSURE OF THE INVENTION

We have found according to the present invention that many of the non-volatile polar materials used in the process of WO-A-98/13148 can also facilitate selective stripping of a top coat from an undercoat when they are included in one of the coating compositions.

Thus, according to one aspect of the invention an undercoat composition which comprises a film-forming synthetic resin is characterised in that the undercoat composition contains a non-volatile acidic aromatic polar organic compound in free acid or salt form, which compound facilitates the removal by a stripping composition of a top coat paint which is subsequently applied over the undercoat. Preferably, the synthetic resin contains functional groups whereby it is curable and the undercoat composition also contains a curing agent for crosslinking the synthetic resin.

A coating process according to the invention comprises applying to a substrate an undercoat composition (preferably a curable undercoat composition which is then cured), applying a curable top coat composition over the undercoat and curing the top coat, the cured top coat being swellable by a stripping composition, and it is characterised in that the undercoat composition contains a non-volatile acidic aromatic polar organic compound in free acid or salt form, which compound facilitates the removal of the top coat from the undercoat by the stripping composition.

The undercoat composition can for example be an anticorrosive primer composition. This is particularly advantageous since a full, strippable, coating system can be formed from only two coating layers. Alternatively, the undercoat composition can be applied as an intermediate layer over a cured anticorrosive primer composition before curable top coat composition is applied.

If the undercoat composition is an anticorrosive primer, it is usually preferred that the synthetic resin is an epoxy resin and the curing agent contains amine groups, for example the curing agent may be an amino-functional polyamide and/or an araliphatic diamine or an alkylene, arylene or alkarylene diamine. The curing agent can alternatively contain carboxylic acid groups, or alternatively the synthetic resin-may contain carboxylic acid or amine groups with the curing agent containing epoxide groups. Alternatively, the primer can be a thermosetting polyurethane primer in which the synthetic resin contains hydroxyl groups and the curing agent contains blocked or unblocked isocyanate groups or the synthetic resin contains blocked or unblocked isocyanate groups and the curing agent contains hydroxyl groups. The primer coating can be applied from solution or dispersion in an organic solvent or can be a high solids or solventless composition or may be an aqueous composition such as a dispersion, emulsion or solution or may be a water-thinnable primer.

If the undercoat composition is an intermediate layer, it is preferably a curable coating composition which is cured before the top coat is applied. Such a curable composition can for example be based on an epoxy resin with an amino-functional curing agent or on a thermosetting polyurethane as described above. The intermediate layer is most preferably based on a curable resin system which resists stripping solvent, so that it can be overcoated after stripping of the top coat. Alternatively, the intermediate layer can be based on a thermoplastic resin, for example a thermoplastic polyester, polyurethane, fluoropolymer, acrylic polymer or polyamide. The intermediate layer can be a high-solids or solventless composition or can be applied from solution or dispersion in water and/or an organic solvent, for example a thermoplastic resin-based coating can be applied from aqueous dispersion or from a dispersion in water and organic solvent. A water-containing dispersion may for example contain a compound which facilitates the formation of the dispersion, such as a surfactant, which is volatile or is reactive with a component of the coating .composition, so that it does not remain in the coating film as a low molecular weight compound but evaporates from it or reacts with it on curing. A nitroparaffin, for example, can be used as a volatile surfactant.

The acidic aromatic. polar organic compound is preferably a non-polymeric organic compound having a molecular weight in the range 120 to 1500. The acidic aromatic compound generally contains at least one acidic group such as a carboxylic acid group or sulphonic acid or phosphonic acid group present in free acid form or in salt form (in which case the compound may no longer be acidic). The salt may be an. amine salt of a primary, secondary or tertiary amine or an alkali metal or ammonium salt. The acidic group is preferably attached directly to an aromatic ring. Many of the effective compounds additionally contain at least one hydroxy group and/or amino group. The acidic aromatic compound preferably has a molecular weight in the range 120 or 150 up to about 1000 or 1500. Many of the effective compounds are known as dyes, although one of the most preferred compounds is gallic acid (3,4,5-trihydroxybenzoic acid), which is not generally regarded as a dye. Amine salts of gallic acid are particularly preferred. 2,5-Dihydroxybenzoic acid is also effective, although 3,5-dihydroxybenzoic acid is much less effective in giving stripping. 1, 2-Dihydroxybenzene-3, 5-disulphonic acid is also effective in giving selective stripping. Examples of acidic dyes which have been found effective in giving selective stripping are Catechol Violet, Fast Green, Lissamine Green SF, Orange G, Amido Black, Methyl orange, sulphonyl porphyrins, for example 5, 10, 15, 20-tetrakis (4-sulphonatophenyl)-porphine manganese (III) chloride of molecular weight 1023, bromocresol purple, calcion (a sulphonate-functional dye), fluorescent brightener 28 (an optical brightener), Nigrosin (Acid Black 2), Brilliant Black BN, citrazinic acid, xylenol blue Na salt, Reactive Blue 2, xylenol orange Na salt, Brilliant Blue R, Brilliant Blue G and-chromoxane cyanine R. The chemical structures of many of these dyes are shown in WO-A-98/13148 . Aurin (rosolic acid), which is an. acid dye although it does not contain any carboxylic or stronger acid groups, is also moderately effective. Mixtures of acidic aromatic materials can be used, for example mixtures of gallic acid with a dye such as Fast Green. Other examples of acid-functional acidic aromatic polar materials which have given selective stripping are a hyperbranched poly(5-hydroxyisophthalic acid) and poly(styrene sulphonate).

The acidic aromatic compound can be used in free acid. form or can be added as a preformed salt, or a salt of the acidic aromatic compound can be formed in situ in the composition; for example an amine salt can be formed by adding the amine and the acidic aromatic compound to the coating composition.

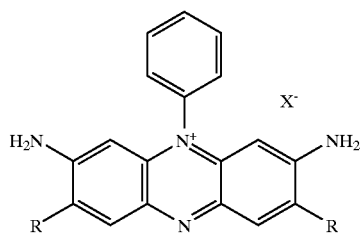

where each R represents methyl and X⁻ is chloride, which does not contain any acidic groups, has also been found to be effective and its use is also covered by the present invention, although other dyes containing amine or hydroxyl groups with no acidic groups, such as malachite green, night blue and crystal violet, have been found to be ineffective. We believe that analogous compounds to Safranine O in which R is hydrogen or another lower (1–4c) alkyl group and/or X⁻ is another anion are also effective.

The acidic aromatic compound is preferably present at a concentration of at least 0.01% by weight, most preferably at least 0.05% or 0.1% by weight, in the coating composition as applied and preferably at least 0.05% by weight, most preferably at least 0.1% or 0.2%. by weight, in the dry coating to give the desired ease of removal of the top coat by the stripping composition. A level of 0.2% to 0.5% by weight in the wet coating composition, for example 0.25% by weight, is particularly preferred. The level of acidic aromatic compound is preferably below 4% by weight, more preferably below 2% and most preferably below 1% by weight, of the wet coating composition (below 10%, most preferably below 5 or 2%, by weight of the dry coating) for an anticorrosive primer composition. Higher levels have also been found to provide strippability of the top coat, but care must be taken not to adversely affect the other properties of the primer.

An undercoat composition according to the invention which is an anticorrosive primer. generally contains an anticorrosive pigment such as a chromate, phosphate, phosphonate or molybdate or a pigment as described in WO 97/13888 and may contain one or more other pigments and/or fillers. Such an anticorrosive primer is generally applied at 5–100 μm dry film thickness. The primer is generally stored as a 2- or 3-pack composition, with the film-forming resin and the curing agent being stored in separate packages and in some cases catalyst and/or additives being stored as a third package, all the packages to be mixed shortly before application of the coating to the substrate. The acidic aromatic compound can in general be included in any of the packs of such a coating. In a 3-pack composition it is preferably included with the catalyst and additives. In a 2-pack epoxy amine primer the acidic aromatic ;compound is preferably packaged with the amine, and in a 2-pack polyurethane it is preferably packaged with the hydroxy-functional component.

If the undercoat composition is an interlayer applied over an anticorrosive primer, the level of acidic aromatic compound is generally below 5% by weight of the wet coating composition and below 10% by weight of the dry coating, and it is preferably below 1 to 2% by weight of the wet coating. The interlayer coating can be formulated as an additional anticorrosive primer layer containing anticorrosive pigment, or it can be formulated similarly to a top coat with opacifying pigment, or it can simply contain a film-forming resin and the acidic aromatic compound, optionally with one or more fillers or inert pigments. The interlayer coating can for example be applied at 1 to 100 μm, preferably 5 to 25 μm, dry film thickness.

The top coat paint which is applied over an undercoat composition of the invention is generally a curable coating comprising at least two co-reactive components, which are usually packaged separately and mixed at application (for example by a twin-feed spray) or shortly before application (for example up to 8 hours before). The top coat paint, particularly for aircraft coatings, is preferably a polyurethane such as a polyester-urethane, although other. curable paints such as polyester, fluoropolymer or acrylic polymer paints, including reactive acrylic polymer systems based on oxazolidine functionality, may be used. The top coat paint is preferably applied from organic solvent solution, including high solids formulations, but it can in general be applied from dispersion in water and/or organic solvent or as a solventless (100% solids) composition.

According to another aspect of the invention, a top coat composition comprises a film-forming synthetic resin having functional groups and a curing agent for crosslinking the synthetic resin and is characterised in that the top coat composition contains a non-volatile acidic aromatic polar organic compound in free acid or salt form, which compound facilitates the removal of the cured top coat by a stripping composition from a cured undercoat of similar composition which does not contain the said acidic aromatic polar organic compound.

A process for overcoating a substrate having a cured primer coating with. a curable top coat composition which when cured is swellable by a stripping composition is characterised according to this aspect of the invention in that a first layer of the top coat composition is applied to the primed substrate and cured and a second layer of the top coat composition containing a non-volatile acid aromatic polar organic compound in free acid or salt form is coated over the first layer and cured, whereby the subsequent removal of the second layer from the first layer by the stripping composition is facilitated.

In some cases it is desirable that the top coat is strippable from an intermediate layer applied over an anticorrosive primer, for example a relatively temporary decorative coating applied over a permanent coating layer. We have found for example that a top coat composition according to the invention containing an acidic aromatic compound in a cured polyurethane top coat can be stripped from an intermediate layer (first top coat layer) of similar composition. The top coat composition can for example be based on a synthetic resin containing hydroxyl groups and a curing agent containing blocked or unblocked isocyanate groups, or on a synthetic resin containing blocked or unblocked isocyanate groups and a curing agent containing hydroxyl groups. The top coat composition can alternatively be based on a polyester, fluoropolymer or acrylic polymer, for example an oxazolidine-functional acrylic polymer. Both layers of the top coat composition are in general pigmented with one or more opacifying pigments, for example titanium dioxide or a colour pigment such as phthalocyanine.

The coating composition of the invention, whether it is an undercoat or a top coat, can in general be based on other curing chemistries. For example, the synthetic resin may contain activated —CH— groups bonded to at least two electron-withdrawing groups with a curing agent containing blocked or unblocked amine groups, epoxide groups or acrylic or methacrylic groups, or the synthetic resin may contain acrylic or methacrylic groups, epoxide groups or blocked or unblocked amine groups with a curing agent containing activated —CH— groups. The preferred activated —CH— groups are acetoacetate groups, although malonate ester, 1,3-diketone or cyanoacetate groups are alternatives. For example, a synthetic resin containing acetoacetate groups can be used with a curing agent containing blocked or unblocked amine groups. An epoxy resin can be used with a curing agent containing acetoacetate groups. A synthetic resin containing acrylic or methacrylic groups, for example a urethane acrylate, can be used with a curing agent containing acetoacetate groups. In an alternative curing chemistry, the synthetic resin contains anhydride groups and the curing agent contains hydroxyl groups or the synthetic resin contains hydroxyl groups and the-curing agent contains anhydride groups.

The acidic aromatic compound used in the top coat composition of the invention can in general be any of those listed above for use in an undercoat, and it can be used in free acid or salt, for example amine salt, form. The acidic aromatic compound is preferably present in the top coat paint at a concentration of at least 0.01% by weight, more preferably at least 0.05t and most preferably at least 0.1% by weight, of the coating composition (at least 0.05%, preferably at least 0.2%, by weight of the dry coating) up to 2% or 4% by weight of the coating composition (4 or 10% by weight of the dry coating).

The top coat composition of the invention is usually a 2-pack or 3-pack composition, and the acidic aromatic compound can be packaged in any of the packs as described above in connection with primers. The coating composition of the invention, whether an undercoat or top coat, can alternatively be a single pack composition cured by moisture, oxygen, heat (for example a powder coating), UV, electron beam or laser radiation or by application of curing agent vapour. An undercoat composition according to the invention can be applied by extrusion coating or as a preformed film.

After the top coat has been allowed to cure, preferably for at least 3 days, it adheres firmly to the primer, and the coating system is resistant to spraying with salt-laden lo water and to immersion in "Skydrol" phosphate ester and generally to immersion in water, so that neither separation of the top coat from the primer or undercoat nor significant blistering occurs. However, when the top coat is treated with a paint stripper in which it swells, particularly a stripper of a type used commercially to strip aircraft paints, swelling of the top coat is followed by detachment from the primer or undercoat. The top coat lifts off the primer and may fall right away or is readily removed by low-pressure water washing. The top coat can readily be removed within a time which is generally 10 minutes to 5 hours and usually 0.5 to 2 hours after application of the paint stripper, without any removal of the primer or of a cured interlayer undercoat. The primer or cured undercoat may be somewhat swollen or discoloured by the paint stripper, but it resists removal with the top coat and continues to adhere to the substrate. Any swelling of the primer or undercoat subsides as the paint stripper dries. The stripper most widely used to strip aircraft paints, particularly polyurethane top coats, is an aqueous thickened mixture of benzyl alcohol and formic acid. Alternative strippers are alkaline thickened aqueous benzyl alcohol or a stripper based on methylene chloride and phenol (used to strip certain fluoropolymer and acrylic top coats).

After stripping of the top coat, the primer/undercoat can be recoated with a fresh top coat. In particular, an undercoat composition according to the invention can be re-coated with a fresh top coat and, after use in service, the fresh top coat can in its turn be readily stripped from the undercoat by a stripping solvent, allowing further repainting with top coat.

The invention is illustrated by the following Examples.

EXAMPLE 1

Aluminium panels were chromic acid pickled and sprayed with 15–20 μm of a high-solids (volatile organic content (VOC) 360 g/l) primer based on a liquid bisphenol F epoxy resin containing anticorrosive pigments and an amine curing agent, applied from organic solvent solution, and allowed to cure at ambient temperature. At the time of mixing of the epoxy primer base and curing agent, a solution of gallic acid dissolved in acetone was added with stirring, so that the final concentration of gallic acid in the mixed wet paint was 0. 2% by weight.

18 hours after the application of the primer with gallic acid incorporated, the primed panels were topcoated with 40–50 μm dry film thickness of a pigmented polyurethane topcoat applied from an organic solvent blend. The topcoat was a 2-pack polyurethane of a type commonly used for aircraft, comprising a hydroxy-functional polyester component and an aliphatic polyisocyanate component. The topcoat was allowed to cure under ambient conditions for one week before being tested for selective strippability and chemical resistance.

Some of the painted panels were coated with "Turco. 9090" formic acid-based stripping formulation, Turco 1270/5 benzyl alcohol-based basic stripper and Dasic D83 methylene. chloride-based stripper. After 5–60 minutes the topcoat had lifted off the primer in each case.

The topcoat was then readily removed with a low-pressure water wash used to clean off the stripping formulation, leaving a clean intact primer surface.

Some of the panels were tested to AIMS 04-04-014, including 14-days' immersion in Skydrol at 70° C. and 14 days' water immersion, and were found to meet the requirements.

EXAMPLE 2

The process of Example 1 was repeated with a high-solids, bisphenol A-based epoxy primer containing anticorrosive pigments reacted with an amine curing agent, applied from organic solution. Gallic acid dissolved in acetone was added at 0.2% by weight gallic acid based on the primer. The primer was overcoated after 20 hours with 60 μm of the topcoat applied in Example 1. The panels were air dried for 7 days.

Some of the coated panels were coated with "Turco 9090", Turco 1270/5 and Dasic D83 stripping formulations. The topcoat lifted off the primer in each case and was then readily removed with a low-pressure water wash, leaving a clean intact primer surface.

Some of the panels were tested to AIMS 04-04-014, including 14 days' immersion in Skydrol at 70° C. and 14 days' water immersion, and were found to meet the requirements.

EXAMPLE 3

Chromic acid-pickled aluminium panels were coated with 12–18 μm of a conventional solids (VOC 550 g/l) primer based on a solid bisphenol A epoxy resin containing anticorrosive pigment, cured with an amine and applied from organic solvent. Just after the time of mixing the epoxy and curing agent, Tiron (Trade Mark) (which is the disodium salt of an aromatic sulphonic acid believed to be 1,2-dihydroxybenzene-3,5-disulphonic acid), dissolved in deionised water, was added dropwise to give a final concentration of Tiron in the mixed wet paint of 0.5% by weight. The primer was overcoated after 6 hours with 45–60 μm of the topcoat applied in Example 1. The panels were air dried for 7 days.

Some of the painted panels were coated with "Turco 90901" formic acid-based stripping formulation. After 30–60 minutes the topcoat had lifted off the primer.

Some of the panels were coated with "Turco 5351" methylene chloride/phenol-based stripping formulation.

After 3 minutes the topcoat had lifted from all of these panels.

The topcoat was then readily removed with a low-pressure water wash used to clean off the stripping solvent, leaving a clean intact primer surface.

Some of the panels were tested by immersion in hot (70°C.) Skydrol hydraulic fluid for 7 days and by 14 days' water immersion. No deterioration was observed.

EXAMPLE 4

Chromic acid-pickled aluminium panels were sprayed with 13–19 μm of a conventional solids epoxy primer (VOC 550 g/l) containing anticorrosive pigment, cured with an amine and applied from organic solvent.

This was allowed to air dry 20 for hours.

A solution of gallic acid was neutralised to pH6 with ammonia solution and added dropwise with stirring to the epoxy component of a pigmented paint formulation based on the epoxy resin of Example 1, containing no anticorrosive pigments, cured with an amine curing agent, and applied from organic solvent solution. The concentration of gallic acid ammonium salt in the mixed wet paint was equal to 0.2% by weight gallic acid.

The paint containing the amine salt of gallic acid described above was sprayed onto the anticorrosive epoxy primer with a film thickness of 15–18 μm. The intermediate coat was allowed to dry for 5 hours at ambient conditions. 40–60 μm of the topcoat as used in Example 1 was sprayed on top.

The panels were air dried for 3 days and force dried at 70° C. for 3 hours.

Some of the painted panels were coated with "Turco 909011" formic acid-based stripping formulation. After.40–60 minutes the topcoat had lifted off the primer.

Some of the panels were tested by immersion in hot (70° C.) Skydrol hydraulic fluid for 7 days. No deterioration was observed.

EXAMPLE 5

Chromic acid pickled aluminium panels were sprayed with 15–20 μm of a water-based epoxy primer (VOC<250 g/l) containing anticorrosive pigments reacted with an amine curing agent. Gallic acid neutralised to pH6 with ammonia solution was added to the primer at 0.3% by weight. After 16 hours' drying, the primer was overcoated with a high-solids 2-component polyurethane topcoat at dry film thickness of 60 μm. The topcoat was allowed to cure at ambient conditions for one week before being tested for selective strippability and chemical resistance.

Panels were coated with Turco 9090 and Turco 1270/5 and gave selective stripping after 45–60 minutes.

Panels were found to be resistant to immersion in Skydrol at 70° C. for 7 days and in water at 23° C. for 7 days.

EXAMPLE 6

Chromic acid pickled aluminium panels were coated with 15–20 μm of either a high-solids epoxy primer as in Example 1 or a conventional solids epoxy primer as in Example 3, containing anticorrosive pigments, reacted with an amine curing agent, applied from organic solvent solution and allowed to cure at ambient temperature.

The epoxy primer was allowed to dry for 4 hours before overcoating with an intermediate coating formulation containing the triethanolamine salt of gallic acid. The intermediate formulation contained a mixture of an aqueous polyurethane dispersion and an aqueous acrylic dispersion into which was added 2 g (per 100 g of polymer dispersion of pre-manufactured triethanolamine salt of gallic acid in water. The intermediate formulation also contained rheology modifiers and flow additives and had a VOC of 370 g/l. The intermediate formulation was applied at 20 μm dry film thickness.

After 4 hours' cure at ambient temperature the intermediate was overcoated with 60 μm of a high-solids pigmented polyurethane topcoat applied from an organic solvent blend.

The scheme was allowed to cure at ambient temperature for one week before being tested for selective strippability and chemical resistance.

Some of the panels were coated with "Turco 1270/5" benzyl alcohol-based stripping formulation. After 25 minutes at 25° C. the topcoat and intermediate had lifted off the primer. The intermediate was wiped off with a cleaning solution, leaving the primer surface intact.

Some of the panels were tested by immersion in hot (70° C.) Skydrol hydraulic fluid for 7 days, and some were immersed in water at 40° C. for 7 days. In both cases no deterioration was observed.

What is claimed is:

1. An intermediate layer composition for applying over a cured primer coated substrate, which intermediate layer composition comprises a film-forming synthetic resin,
    characterized in that the intermediate layer composition contains a non-volatile acidic aromatic polar organic compound in free acid or salt form, wherein the intermediate layer composition comprises the non-volatile acidic aromatic polar organic compound in free acid or salt form when cured, and with the proviso that when the non-volatile acidic aromatic polar organic compound contains at least one sulfonic acid group, the compound containing at least one sulfonic acid group is present in an amount greater than 0.05% by weight of the total weight of the cured intermediate layer composition, and
    characterized in that the synthetic resin has functional groups whereby it is curable and the intermediate layer composition contains a curing agent for crosslinking the synthetic resin, wherein the synthetic resin and curing agent are characterized by at least one of the following:
    the synthetic resin is an epoxy resin and the curing agent contains carboxylic acid groups;
    the synthetic resin contains amine or carboxylic acid groups and the curing agent contains epoxide groups;
    the synthetic resin contains hydroxyl groups and the curing agent contains blocked or unblocked isocyanate groups;
    the synthetic resin contains blocked or unblocked isocyanate groups and the curing agent contains hydroxyl groups;
    the synthetic resin contains activated —CH— groups bonded to at least two electron withdrawing groups and the curing agent contains blocked or unblocked amine groups, epoxide groups or, acrylic or methacrylic groups;
    the synthetic resin contains blocked or unblocked amine groups, epoxide groups or, acrylic or methacrylic groups and the synthetic resin contains activated —CH— groups bonded to at least two electron withdrawing groups;
    the synthetic resin contains anhydride groups and the curing agent contains hydroxyl groups; and
    the synthetic resin hydroxyl groups and the curing agent contains anhydride groups.

2. An intermediate layer composition for applying over a cured primer coated substrate, which intermediate layer composition comprises a film-forming synthetic resin,
    characterized in that the intermediate layer composition contains a non-volatile acidic aromatic polar organic compound in free acid or salt form, wherein the intermediate layer composition comprises the non-volatile acidic aromatic polar organic compound in free acid or salt form when cured, and with the proviso that when the non-volatile acidic aromatic polar organic compound contains at least one sulfonic acid group, the compound containing at least one sulfonic acid group is present in an amount greater than 0.05% by weight of the total weight of the cured intermediate layer composition, and
    characterized in that the synthetic resin has functional groups whereby it is curable and the intermediate layer composition contains a curing agent for crosslinking the synthetic resin, and
    characterized in that the synthetic resin is an epoxy resin and the curing agent contains carboxylic acid groups, or the synthetic resin contains amine or carboxylic acid groups and the curing agent contains epoxide groups.

3. An intermediate layer composition for applying over a cured primer coated substrate, which intermediate layer composition comprises a film-forming synthetic resin,
    characterized in that the intermediate layer composition contains a non-volatile acidic aromatic polar organic compound in free acid or salt form, wherein the intermediate layer composition comprises the non-volatile acidic aromatic polar organic compound in free acid or salt form when cured, and with the proviso that when the non-volatile acidic aromatic polar organic compound contains at least one sulfonic acid group, the compound containing at least one sulfonic acid group is present in an amount greater than 0.05% by weight of the total weight of the cured intermediate layer composition, and
    characterized in that the synthetic resin has functional groups whereby it is curable and the intermediate layer composition contains a curing agent for crosslinking the synthetic resin, and
    characterized in that the synthetic resin contains hydroxyl groups and the curing agent contains blocked or unblocked isocyanate groups, or the synthetic resin contains blocked or unblocked isocyanate groups and the curing agent contains hydroxyl groups.

4. An intermediate layer composition for applying over a cured primer coated substrate, which intermediate layer composition comprises a film-forming synthetic resin,
    characterized in that the intermediate layer composition contains a non-volatile acidic aromatic polar organic compound in free acid or salt form, wherein the intermediate layer composition comprises the non-volatile acidic aromatic polar organic compound in free acid or salt form when cured, and with the proviso that when the non-volatile acidic aromatic polar organic compound contains at least one sulfonic acid group, the compound containing at least one sulfonic acid group is present in an amount greater than 0.05% by weight of the total weight of the cured intermediate layer composition, and characterized in that the synthetic resin has functional groups whereby it is curable and the intermediate layer composition contains a curing agent for crosslinking the synthetic resin, and characterized in that the synthetic resin contains activated —CH— groups bonded to at least two electron-withdrawing groups and the curing agent contains blocked or unblocked amine groups, epoxide groups or acrylic or methacrylic groups, or the synthetic resin contains acrylic or methacrylic groups, epoxide groups or blocked or unblocked amine groups and the curing agent contains activated —CH— groups bonded to at least two electron-withdrawing groups.

5. An intermediate layer composition for applying over a cured primer coated substrate, which intermediate layer composition comprises a film-forming synthetic resin, characterized in that the intermediate layer composition contains a non-volatile acidic aromatic polar organic compound in free acid or salt form, wherein the intermediate layer composition comprises the non-volatile acidic aromatic polar organic compound in free acid or salt form when cured, and with the proviso that when the non-volatile acidic aromatic polar organic compound contains at least one sulfonic acid group, the compound containing at least one sulfonic acid group is present in an amount greater than 0.05% by weight of the total weight of the cured intermediate layer composition, and characterized in that the synthetic resin has functional groups whereby it is curable and the intermediate layer composition contains a curing agent for crosslinking the synthetic resin, and characterized in that the synthetic resin contains anhydride groups and the curing agent contains hydroxyl groups, or the synthetic resin contains hydroxyl groups and the curing agent contains anhydride groups.

6. An intermediate layer composition according to claim 1, characterized in that the non-volatile acidic aromatic polar organic compound is a non-polymeric organic compound having a molecular weight in the range of 120 to 1500.

7. An intermediate layer composition according to claim 1, characterized in that the non-volatile acidic aromatic polar organic compound contains at least one carboxylic acid group.

8. An intermediate layer composition according to claim 1, characterized in that the non-volatile acidic aromatic polar organic compound contains at least one sulfonic acid group.

9. An intermediate layer composition according to claim 7, characterized in that the non-volatile acidic aromatic polar organic compound additionally contains at least one hydroxy group and/or amino group.

10. An intermediate layer composition according to claim 1, characterized in that the aromatic compound is gallic acid.

11. An intermediate layer composition according to claim 1, characterized in that the non-volatile acidic aromatic polar organic compound is present therein at 0.05 to 1% by weight.

12. A top coat composition for overcoating a cured coating, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the top coat composition comprises the non-volatile acidic aromatic polar organic compound in free acid or salt form when cured, and with the proviso that when the non-volatile acidic aromatic polar organic compound comprises at least one sulfonic acid group, the compound containing at least one sulfonic acid group is present in an amount greater than 0.05% by weight of the total weight of the cured composition, and wherein the synthetic resin and the curing agent are characterized by at least one of the following:

the synthetic resin contains hydroxyl groups and the curing agent contains blocked or unblocked isocyanate groups;

the synthetic resin contains blocked or unblocked isocyanate groups and the curing agent contains hydroxyl groups;

the synthetic resin contains activated —CH— groups bonded to at least two electron withdrawing groups and the curing agent contains blocked or unblocked amine groups, epoxide groups or, acrylic or methacrylic groups;

the synthetic resin contains blocked or unblocked amine groups, epoxide groups or, acrylic or methacrylic groups and the synthetic resin contains activated —CH— groups bonded to at least two electron withdrawing groups;

the synthetic resin contains anhydride groups and the curing agent contains hydroxyl groups;

the synthetic resin contains hydroxyl groups and the curing agent contains anhydride groups; and the synthetic resin is a fluoropolymer.

13. A top coat composition for overcoating a cured coating, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the top coat composition comprises the non-volatile acidic aromatic polar organic compound in free acid or salt form when cured, and with the proviso that when the non-volatile acidic aromatic polar organic compound comprises at least one sulfonic acid group, the compound containing at least one sulfonic acid group is present in an amount greater than 0.05% by weight of the total weight of the cured composition, and characterized in that the synthetic resin is a polyester, fluoropolymer or acrylic polymer.

14. A top coat composition for overcoating a cured coating, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the top coat composition comprises the non-volatile acidic aromatic polar organic compound in free acid or salt form when cured, and with the proviso that when the non-volatile acidic aromatic polar organic compound comprises at least one sulfonic acid group, the compound containing at least one sulfonic acid group is present in an amount greater than 0.05% by weight of the total weight of the cured composition, and characterized in that the synthetic resin contains hydroxyl groups and the curing agent contains blocked or unblocked isocyanate groups, or the synthetic resin contains blocked or unblocked isocyanate groups and the curing agent contains hydroxyl groups.

15. A top coat composition for overcoating a cured coating, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the top coat composition comprises the non-volatile acidic aromatic polar organic compound in free acid or salt form when cured, and with the proviso that when the non-volatile acidic aromatic polar organic compound comprises at least one sulfonic acid group, the compound containing at least one sulfonic acid group is present in an amount greater than 0.05% by weight of the total weight of the cured composition, and characterized in that the synthetic resin contains activated —CH— groups bonded to at least two electron-withdrawing groups and the curing agent contains blocked or unblocked amine groups, epoxide groups or acrylic or methacrylic groups, or the synthetic resin contains acrylic or methacrylic groups, epoxide groups or blocked or unblocked amine groups and the curing agent contains activated —CH— groups bonded to at least two electron-withdrawing groups.

16. A top coat composition for overcoating a cured coating, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the top coat composition comprises the non-volatile acidic aromatic polar organic compound in free acid or salt form when cured, and with the proviso that when the non-volatile acidic aromatic polar organic compound comprises at least one sulfonic acid group, the compound containing at least one sulfonic acid group is present in an amount greater than 0.05% by weight of the total weight of the cured composition, and characterized in that the synthetic resin contains anhydride groups and the curing agent contains hydroxyl groups, or the synthetic resin contains hydroxyl groups and the curing agent contains anhydride groups.

17. A top coat composition according to claim 12, characterized in that the non-volatile acidic aromatic polar organic aromatic compound is a non-polymeric organic compound having a molecular weight in the range of 120 to 1500.

18. A top coat composition according to claim 12, characterized in that the non-volatile acidic aromatic polar organic compound contains at least one carboxylic acid group.

19. A top coat composition according to claim 12, characterized in that the non-volatile acidic aromatic polar organic compound contains at least one sulfonic acid group.

20. A top coat composition according to claim 18, characterized in that the non-volatile acidic aromatic polar organic compound additionally contains at least one hydroxy group and/or amino group.

21. A top coat composition according to claim 12, characterized in that the non-volatile acidic aromatic polar organic compound is gallic acid.

22. A top coat composition according to claim 12, characterized in that the non-volatile acidic aromatic polar organic compound is present therein at 0.05 to 1% by weight.

23. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition; and characterized in that the undercoat composition comprises a film-forming synthetic resin characterized in that the synthetic resin has functional groups whereby it is curable and the undercoat composition contains a curing agent for crosslinking the synthetic resin, wherein the synthetic resin and curing agent are characterized by at least one of the following:

the synthetic resin contains an epoxy resin and the curing agent contains carboxylic acid groups;

the synthetic resin contains amine or carboxylic acid groups and the curing agent contains epoxide groups, the synthetic resin contains hydroxyl groups and the curing agent contains blocked or unblocked isocyanate groups;

the synthetic resin contains blocked or unblocked isocyanate groups and the curing agent contains hydroxyl groups;

the synthetic resin contains activated —CH— groups bonded to at least two electron withdrawing groups and the curing agent contains blocked or unblocked amine groups, epoxide groups or, acrylic or methacrylic groups;

the synthetic resin contains blocked or unblocked amine groups, epoxide groups or, acrylic or methacrylic groups and the curing agent contains activated —CH— groups bonded to at least two electron withdrawing groups;

the synthetic resin contains anhydride groups and the curing agent contains hydroxyl groups; and the synthetic resin contains hydroxyl groups and the curing agent contains anhydride groups.

24. A process according to claim 23, characterized in that the undercoat composition is an anticorrosive primer composition.

25. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition, and characterized in that the non-volatile acidic aromatic polar organic compound is present at 0.05 to 1% by weight in the primer composition.

26. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition, and characterized in that the undercoat composition is applied as an intermediate layer over a cured anticorrosive primer composition before the curable top coat composition is applied.

27. A process according to claim 23, characterized in that the non-volatile acidic aromatic polar organic compound is a non-polymeric organic compound having a molecular weight in the range of 120 to 1500.

28. A process according to claim 23, characterized in that the non-volatile acidic aromatic polar organic compound contains at least one carboxylic acid group.

29. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition, and characterized in that the non-volatile acidic aromatic polar organic compound contains at least one sulfonic acid group.

30. A process according to claim 28, characterized in that the non-volatile acidic aromatic polar organic compound additionally contains at least one hydroxy group and/or amino group.

31. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition, and characterized in that the non-volatile acidic aromatic polar organic compound contains at least one sulfonic acid group and additionally contains at least one hydroxy group and/or amino group.

32. A process according to claim 23, characterized in that the non-volatile acidic aromatic polar organic compound is gallic acid.

33. A process for coating a substrate comprising applying to the substrate a curable undercoat composition and curing the undercoat, and applying a curable top coat composition over the undercoat and curing the top coat, the cured top coat being swellable by a stripping composition, characterized in that the undercoat composition contains a non-volatile acidic aromatic polar organic compound in free acid or salt form, which compound facilitates the removal of the top coat from the undercoat by the stripping composition, and characterized in that the non-volatile acidic aromatic polar organic compound is present in amine salt form.

34. A process for overcoating a substrate having a cured primer coating to facilitate the removal by a stripping composition of a subsequently applied top coat, characterized in that a coating composition comprising a film-forming resin and a non-volatile acidic aromatic polar organic compound in free acid or salt form, which compound facilitates the said removal of the top coat, is coated over the cured primer coating before the top coat is applied.

35. A process according to claim 34, characterized in that the said coating composition is a curable coating composition and is cured before the top coat is applied.

36. A processing according to claim 34, characterized in that the said coating composition comprises a thermoplastic synthetic resin.

37. A process according to claim 34, characterized in that the said coating composition is applied from an aqueous dispersion.

38. A process according to claim 37, characterized in that the aqueous dispersion contains a volatile or reactive surfactant which facilitates the formation of the dispersion and which evaporates from the coating on application or reacts with the coating composition on curing.

39. A process according claim 34, characterized in that the non-volatile acidic aromatic polar organic compound is present at 0.05 to 5% by weight in the said coating composition.

40. A process according to claim 34, characterized in that the non-volatile acidic aromatic polar organic compound is a non-polymeric organic compound having a molecular weight in the range of 120 to 1500.

41. A process according to claim 34, characterized in that the non-volatile acidic aromatic polar organic compound contains at least one carboxylic acid group.

42. A process according to claim 34, characterized in that the non-volatile acidic aromatic polar organic compound contains at least one sulfonic acid group.

43. A process according to claim 40, characterized in that the non-volatile acidic aromatic polar organic compound additionally contains at least one hydroxy group and/or amino group.

44. A process according to claim 42, characterized in that the non-volatile acidic aromatic polar organic compound additionally contains at least one hydroxy group and/or amino group.

45. A process according to claim 34, characterized in that the non-volatile acidic aromatic polar organic compound is gallic acid.

46. A process according to claim 34, characterized in that the non-volatile acidic aromatic polar organic compound is present in amine salt form.

47. A process for overcoating a substrate having a cured primer coating with a curable top coat composition which when cured is swellable by a stripping composition, characterized in that a first layer of the top coat composition is applied to the primed substrate and cured, and a second layer of the top coat composition containing non-volatile acidic aromatic polar organic compound in free acid or salt form is coated over the first layer and cured, whereby the subsequent removal of the second layer from the first layer by the stripping composition is facilitated.

48. A process according to claim 47, characterized in that the non-volatile acidic aromatic polar organic compound is present at 0.05 to 1% by weight in the top coat composition applied as the second layer.

49. A process according to claim 47, characterized in that the non-volatile acidic aromatic polar organic compound is a non-polymeric organic compound having a molecular weight in the range of 120 to 1500.

50. A process according to claim 47, characterized in that the non-volatile acidic aromatic polar organic compound contains at least one carboxylic acid group.

51. A process according to claim 47, characterized in that the non-volatile acidic aromatic polar organic compound contains at least one sulfonic acid group.

52. A process according to claim 40, characterized in that the non-volatile acidic aromatic polar organic compound additionally contains at least one hydroxy group and/or amino group.

53. A process according to claim 51, characterized in that the non-volatile acidic aromatic polar organic compound additionally contains at least one hydroxy group and/or amino group.

54. A process according to claim 47, characterized in that the non-volatile acidic aromatic polar organic compound is gallic acid.

55. A process according to claim 47, characterized in that the non-volatile acidic aromatic polar organic compound is present in amine salt form.

56. A process for coating a substrate comprising applying to the substrate an undercoat composition, applying a curable top coat composition over the undercoat and curing the top coat, the cured top coat being swellable by a stripping composition, characterized in that the undercoat composition contains a compound of the structure

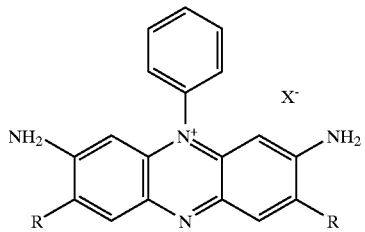

where each R represents a hydrogen atom or an alkyl group having 1 to 4 carbon atoms and X represents an anion, which compound facilitates the removal of the top coat from the undercoat by the stripping composition.

57. An undercoat composition for coating a substrate, which undercoat composition comprises a film-forming synthetic resin having functional groups and a curing agent for crosslinking the synthetic resin, characterized in that the undercoat composition contains a non-volatile acidic aromatic polar organic compound in free acid or salt form, wherein the non-volatile acidic aromatic polar organic compound contains at least one sulfonic acid group and at least one group selected from a hydroxy group and an amino group.

58. An undercoat composition for coating a substrate, which undercoat composition comprises a film-forming synthetic resin, characterized in that the undercoat composition contains a non-volatile acidic aromatic polar organic compound in amine salt form.

59. A top coat composition for applying as the outer coating on a substrate, which top coat composition comprises a film-forming synthetic resin having functional groups and a curing agent for crosslinking the synthetic resin, characterized in that the top coat composition contains a non-volatile acidic aromatic polar organic compound in free acid or salt form, wherein the non-volatile acidic aromatic polar organic compound contains at least one sulfonic acid group and at least one group selected from a hydroxy group and an amino group.

60. A top coat composition for applying as the outer coating on a substrate, which top coat composition comprises a film-forming synthetic resin having functional groups and a curing agent for crosslinking the synthetic resin, characterized in that the top coat composition contains a non-volatile acidic aromatic polar organic compound in amine salt form.

61. An undercoat composition comprising:
a curable film-forming synthetic resin containing amino or carboxylic acid groups;
a curing agent containing epoxide groups for cross-linking the film-forming synthetic resin; and
a non-volatile acidic aromatic polar organic compound in free acid or salt form, wherein the non-volatile acidic aromatic polar organic compound comprises at least one carboxylic acid group and at least one amino group;
wherein the undercoat composition comprises the non-volatile acidic aromatic polar organic compound in free acid or salt form when cured;
and with the proviso that when the non-volatile acidic aromatic polar organic compound contains at least one sulfonic acid group, the compound containing at least one sulfonic acid group is present in an amount greater than 0.05% by weight of the total weight of the cured undercoat composition.

62. An undercoat composition according to claim 61, characterized in that the non-volatile acidic aromatic polar organic compound is a non-polymeric organic compound having a molecular weight in the range of 120 to 1500.

63. An undercoat composition according to claim 61, characterized in that the non-volatile acidic aromatic polar organic compound contains at least one carboxylic acid group.

64. An undercoat composition according to claim 61, characterized in that the non-volatile acidic aromatic polar organic compound contains at least one sulfonic acid group.

65. An undercoat composition according to claim 63, characterized in that the non-volatile acidic aromatic polar organic compound additionally contains at least one hydroxy group and/or amino group.

66. An undercoat composition according to claim 61, characterized in that the aromatic compound is gallic acid.

67. An undercoat composition according to claim 61, characterized in that the non-volatile acidic aromatic polar organic compound is present therein at 0.05 to 1% by weight.

68. An undercoat composition comprising:
a curable film-forming synthetic resin;
a curing agent for cross-linking the film-forming synthetic resin; and
a non-volatile acidic aromatic polar organic compound in free acid or salt form;
wherein the film-forming synthetic resin contains hydroxyl groups and the curing agent contains blocked or unblocked isocyanate groups, or the film-forming synthetic resin contains blocked or unblocked isocyanate groups and the curing agent contains hydroxyl groups; and
wherein the undercoat composition comprises the non-volatile acidic aromatic polar organic compound in free acid or salt form when cured;
and with the proviso that when the non-volatile acidic aromatic polar organic compound contains at least one sulfonic acid group, the compound containing at least one sulfonic acid group is present in an amount greater than 0.05% by weight of the total weight of the cured undercoat composition.

69. An undercoat composition according to claim 68, characterized in that the non-volatile acidic aromatic polar organic compound is a non-polymeric organic compound having a molecular weight in the range of 120 to 1500.

70. An undercoat composition according to claim 68, characterized in that the non-volatile acidic aromatic polar organic compound contains at least one carboxylic acid group.

71. An undercoat composition according to claim 68, characterized in that the non-volatile acidic aromatic polar organic compound contains at least one sulfonic acid group.

72. An undercoat composition according to claim 70, characterized in that the non-volatile acidic aromatic polar organic compound additionally contains at least one hydroxy group and/or amino group.

73. An undercoat composition according to claim 68, characterized in that the aromatic compound is gallic acid.

74. An undercoat composition according to claim 68, characterized in that the non-volatile acidic aromatic polar organic compound is present therein at 0.05 to 1% by weight.

75. An undercoat composition comprising:
   a curable film-forming synthetic resin containing acrylic or methacrylic groups, epoxide groups or blocked or unblocked amine groups;
   a curing agent containing activated —CH— groups bonded to at least two electron-withdrawing groups for cross-linking the film-forming synthetic resin; and
   a non-volatile acidic aromatic polar organic compound in free acid or salt form;
   wherein the undercoat composition comprises the non-volatile acidic aromatic polar organic compound in free acid or salt form when cured;
   and with the proviso that when the non-volatile acidic aromatic polar organic compound contains at least one sulfonic acid group, the compound containing at least one sulfonic acid group is present in an amount greater than 0.05% by weight of the total weight of the cured undercoat composition.

76. An undercoat composition according to claim 75, characterized in that the non-volatile acidic aromatic polar organic compound is a non-polymeric organic compound having a molecular weight in the range of 120 to 1500.

77. An undercoat composition according to claim 75, characterized in that the non-volatile acidic aromatic polar organic compound contains at least one carboxylic acid group.

78. An undercoat composition according to claim 75, characterized in that the non-volatile acidic aromatic polar organic compound contains at least one sulfonic acid group.

79. An undercoat composition according to claim 77, characterized in that the non-volatile acidic aromatic polar organic compound additionally contains at least one hydroxy group and/or amino group.

80. An undercoat composition according to claim 75, characterized in that the aromatic compound is gallic acid.

81. An undercoat composition according to claim 75, characterized in that the non-volatile acidic aromatic polar organic compound is present therein at 0.05 to 1% by weight.

82. An undercoat composition comprising:
   a curable film-forming synthetic resin;
   a curing agent for crosslinking the film-forming synthetic resin; and
   a non-volatile acidic aromatic polar organic compound in free acid or salt form;
   wherein the film-forming synthetic resin contains anhydride groups and the curing agent contains hydroxyl groups, or the synthetic resin contains hydroxyl groups and the curing agent contains anhydride groups; and
   wherein the undercoat composition comprises the non-volatile acidic aromatic polar organic compound in free acid or salt form when cured;
   and with the proviso that when the non-volatile acidic aromatic polar organic compound contains at least one sulfonic acid group, the compound containing at least one sulfonic acid group is present in an amount greater than 0.05% by weight of the total weight of the cured undercoat composition.

83. An undercoat composition according to claim 82, characterized in that the non-volatile acidic aromatic polar organic compound is a non-polymeric organic compound having a molecular weight in the range of 120 to 1500.

84. An undercoat composition according to claim 82, characterized in that the non-volatile acidic aromatic polar organic compound contains at least one carboxylic acid group.

85. An undercoat composition according to claim 82, characterized in that the non-volatile acidic aromatic polar organic compound contains at least one sulfonic acid group.

86. An undercoat composition according to claim 84, characterized in that the non-volatile acidic aromatic polar organic compound additionally contains at least one hydroxy group and/or amino group.

87. An undercoat composition according to claim 82, characterized in that the aromatic compound is gallic acid.

88. An undercoat composition according to claim 82, characterized in that the non-volatile acidic aromatic polar organic compound is present therein at 0.05 to 1% by weight.

* * * * *